United States Patent
Chen et al.

(10) Patent No.: US 9,164,727 B2
(45) Date of Patent: Oct. 20, 2015

(54) FPGA-BASED HIGH-SPEED LOW-LATENCY FLOATING POINT ACCUMULATOR AND IMPLEMENTATION METHOD THEREFOR

(75) Inventors: Yaowu Chen, Hangzhou (CN); Longtao Yuan, Hangzhou (CN); Fan Zhou, Hangzhou (CN)

(73) Assignee: ZHEJIANG UNIVERSITY, Hangzhou, Zhejiang Province (CN)

( * ) Notice: Subject to any disclaimer, the term of this patent is extended or adjusted under 35 U.S.C. 154(b) by 324 days.

(21) Appl. No.: 13/994,818

(22) PCT Filed: Dec. 1, 2011

(86) PCT No.: PCT/CN2011/083291
§ 371 (c)(1),
(2), (4) Date: Jun. 17, 2013

(87) PCT Pub. No.: WO2012/079466
PCT Pub. Date: Jun. 21, 2012

(65) Prior Publication Data
US 2013/0297666 A1    Nov. 7, 2013

(30) Foreign Application Priority Data

Dec. 17, 2010 (CN) .......................... 2010 1 0594926

(51) Int. Cl.
*G06F 7/485* (2006.01)
*G06F 7/509* (2006.01)
*G06F 7/57* (2006.01)

(52) U.S. Cl.
CPC .............. *G06F 7/485* (2013.01); *G06F 7/5095* (2013.01); *G06F 7/57* (2013.01)

(58) Field of Classification Search
CPC ........ G06F 7/485; G06F 7/509; G06F 7/5095
See application file for complete search history.

(56) References Cited

U.S. PATENT DOCUMENTS

| 5,644,520 A * | 7/1997 | Pan et al. ....................... 708/490 |
| 5,650,952 A * | 7/1997 | Baier et al. ..................... 708/603 |
| 7,212,959 B1 * | 5/2007 | Purcell et ......................... 703/13 |
| 2011/0161624 A1 * | 6/2011 | Flachs et al. ...................... 712/4 |

FOREIGN PATENT DOCUMENTS

| CN | 101506771 | 8/2009 |
| CN | 101794210 | 8/2009 |
| CN | 101577025 | 11/2009 |

* cited by examiner

*Primary Examiner* — Chuong D Ngo
(74) *Attorney, Agent, or Firm* — Jacobson Holman PLLC; Jiwen Chen

(57) ABSTRACT

This invention discloses a FPGA based high-speed low-latency floating-point accumulation and its implementation method. Floating accumulation of this invention comprises a floating-point adder unit, numerous intermediate result buffers, an input control unit and an output control unit. The floating-point accumulation implementation method of this invention is used for gradation of the whole accumulation calculation process to ensure cross execution of accumulation calculation processes and graded storage of intermediate results of accumulation calculation at different levels; meanwhile, the operation in the mode of pure flow line can significantly improve utilization rate of internal floating-point adder, and maintain relatively low latency to output of final results of floating-point accumulation calculation. This invention is expected to improve utilization rate of floating-point adder through dynamic allocation of input data in internal floating-point adder unit, and thereby maintains higher arithmetic speed and relatively low latency while ensuring minimized consumption of logic or DSP resources as required.

10 Claims, 1 Drawing Sheet

FPGA-BASED HIGH-SPEED LOW-LATENCY FLOATING POINT ACCUMULATOR AND IMPLEMENTATION METHOD THEREFOR

This is a U.S. national stage application of PCT Application No. PCT/CN2011/083291 under 35 U.S.C. 371, filed Dec. 1, 2011 in Chinese, claiming the priority benefit of Chinese Application No. 201010594926.X, filed Dec. 17, 2010, which is hereby incorporated by reference.

FIELD OF THE INVENTION

This invention is related to the field of field-programmable gate array (FPGA) technologies and high-performance arithmetic, in particular to a FPGA based high-speed low-latency floating-point accumulator and its implementation method.

BACKGROUND OF THE INVENTION

Floating-point accumulation arithmetic is an important operation of floating-point calculation, which is extensively applied in such fields as process control and digital signal processing. Although previous floating-point arithmetic system is generally implemented with the help of universal floating-point processor or digital signal processor (DSP), and is characterized by advantages like relatively well-established technologies, optimal implementation tools and simple programming, the processor may often yield to such phenomenon as Cache Miss during calculation due to limitations on its internal structure. This may affect calculation performance of the system. The design based on the universal processor and DSP technologies can only maintain the continuous calculation performance at 10%-33% of the peak value, which is unlikely to obtain higher calculation performance.

In recent years, FPGA technologies have witnessed an accelerated development, which has been transformed from the preliminary application of pure logic substitution to the complicated application of intensive calculation. The newly launched FPGA instruments comprise a large number of DSP units, block RAM (Block RAM and BRAM) and RocketIO GTP receiver unit used for high-speed serial communication in addition to integration of abundant of configurable Logic Block (CLB). Meanwhile, to facilitate debugging of FPGA, FPGA manufacturers have also developed testing tools for on-chip logic analysis (such as ChipScope as developed by Xilinx) that make it possible to implement high-performance calculation on the FPGA in terms of both hardware and software. In the aspect of floating-point arithmetic, FPGA is being increasingly applied owing to its flexible configuration and low power consumption.

A floating-point adder inside FPGA is usually realized with the help of logic resources or configurable DSP module. To obtain a higher arithmetic speed, the floating-point adder usually requires flow lines as many as 10 levels, which may result in higher latency to the output of floating-point adding results. Therefore, FPGA based floating-point accumulator of a conventional design often proceeds with adding for different levels in a sequence from a lower level to a higher level; adding results at each level is to be stored in the internal buffer before being applied to the follow-up arithmetic. In this way, when some accumulations are equivalent to or even below the level of flow line of the floating-point adder, the adder might be at the idle status as the duration for adding flow line to complete an operation is longer than the data input time. This may result in significant latency to the output of final accumulation results as compared with input of original data. Under such circumstance, input of original data on follow-up floating-point accumulation is only available when previous floating-point accumulation is nearly completed, which may result in significant latency. On some occasions with higher real-time requirements, such accumulator is unable to satisfy application demands. Despite of the fact that such problem can be solved by providing more floating-point adders, consumption of FPGA logic resources or DSP module will witness a dramatic increase due to the complexity of floating-point arithmetic.

SUMMARY OF THE INVENTION

The present invention provides a FPGA based high-speed low-latency floating-point accumulator of excellent real-time performance and its implementation method, which can significantly improve the utilization of floating-point adders, and maintain relatively low latency while the logic or DSP resources remain basically unchanged.

A FPGA based high-speed low-latency floating-point accumulator, comprising:

A floating-point adder unit used for adding of input floating points; the floating points include original data, intermediate data on accumulated calculation of floating points at each level and latency of flag bit of input floating points in synchronization with adding of corresponding floating points; the floating-point adder unit comprises a conventional floating-point adding module and a synchronous latency logic module for flag bits, which can be implemented with the help of internal logic resources of FPGA or configurable DSP module; to obtain higher arithmetic speed, floating-point adder unit is normally implemented in the form of multilevel flow line.

N intermediate result buffer units corresponding to accumulated calculation of floating points at each level, which are used to buffer intermediate results of accumulated calculation of floating points; N refers to the number of accumulated levels; the intermediate result buffer unit is implemented with the help of internal fifo of FPGA. Because the total data on intermediate results as obtained through floating-point accumulation arithmetic at each level are inconsistent, requirements for the size of intermediate result buffer unit are also different. Therefore, to ensure better utilization of resources, it is applicable to select fifo of appropriate size and type for intermediate buffer unit storing intermediate results obtained through floating-point accumulation arithmetic at different levels according to the quantity of data on intermediate results as obtained through floating-point accumulation arithmetic at each level. This aims to minimize consumption of resources stored in the FPGA;

An input control unit used to receive original data and data on intermediate results of floating-point accumulation arithmetic at all levels, and set different priorities according to data of different origins so as to input paired data of the same priority into the floating-point adder unit for adding operation as per priority level. Meanwhile, it also aims to set flag bits for each pair of data as input into the floating-point adder unit so as to mark out the level of floating-point accumulation arithmetic subjecting to adding operation based on the current data; wherein, different priority levels are to be set for data of different origins; namely, the highest priority level is set for original data; whereas for data on intermediate results of floating-point accumulation arithmetic at each level, corresponding floating-point accumulation arithmetic of higher level will be given a higher priority level;

An output control unit used to determine the level of floating-point accumulation arithmetic of data output from floating-point adder unit according to flag bit synchronously and latently output from the floating-point adder unit. It also aims to judge whether calculated results of current adding as output from the floating-point adder unit is intermediate ones or final ones so as to store intermediate results in the intermediate result buffer unit of corresponding level of floating-point accumulation arithmetic, and output final results.

A FPGA based high-speed low-latency floating-point accumulation implementation method, comprising:

(1) Original floating-point data input steps: An original floating-point data is input from previous calculating or processing module into the floating-point adder unit during each clock period; the original floating-point data is accumulated by taking $M=2^{N+1}$ data as one group; each group of original floating-point data is input continuously; N refers to the number of accumulation levels;

(2) Input control steps: Input control unit is used to receive original data and data on intermediate results of floating-point accumulation arithmetic at all levels, and sets different priorities according to data of different origins so as to input paired data of the same priority into the floating-point adder unit for adding according to priority level. Meanwhile, it also aims to set flag bit for each pair of data as input into the floating-point adder unit so as to mark out the level of floating-point accumulation arithmetic subjecting to adding operation based on the current data; wherein, different priority levels are set for data of different origins; namely, the highest priority level is set for original data; whereas for data on intermediate results of floating-point accumulation arithmetic at each level, corresponding floating-point accumulation arithmetic of higher level is given a higher priority level;

(3) Floating-point accumulation arithmetic steps: Floating-point adder unit aims to proceed with adding of paired floating-point data during each clock period and synchronous latency of flag bit as set by the input control unit in correspondence to such pair of floating-point data;

(4) Output control steps: Output control unit aims to determine the level of floating-point accumulation arithmetic of data output from floating-point adder unit according to flag bit synchronously and latently output from the floating-point adder unit, and accordingly judge whether calculated results of current adding as output from the floating-point adder unit is intermediate ones or final ones so as to store intermediate results in the intermediate result buffer unit of corresponding level of floating-point accumulation arithmetic, and output final results.

When original floating-point data is continuously input into the floating-point adder unit as per clock period, aforesaid steps are to be executed in the mode of flow line; final accumulation results of each group of original floating-point data are continuously output at the interval of $M=2^{N+1}-1$ clock.

As compared with prior art, this invention is provided with the following beneficial technical effects:

The high-speed low-latency floating-point accumulator of this invention is only provided with one floating-point adder unit in it, which has minimized the consumption of a large number of internal logic resources of FPGA or DSP resources as required by floating-point arithmetic. When the high-speed low-latency floating-point accumulator is used for floating-point accumulation arithmetic, the whole accumulation calculation process is to be graded ensure cross accumulation calculation processes and graded storage of intermediate results of accumulation calculation at different levels. Meanwhile, whole adoption of flow line mode can significantly improve utilization efficiency of internal floating-point adder unit, and maintain a relatively low latency to output of final results of floating-point accumulation calculation.

This invention is expected to maintain operation of each level of flow line of floating-point adder unit, and effectively improve utilization of floating-point adder unit through dynamic allocation of data as input into the internal floating-point adder unit while waiting for output by flow line of floating-point adder unit. Thereby, it can ensure a higher arithmetic speed and relatively low latency while minimizing consumption of logic or DSP resources as required.

DETAILED DESCRIPTION OF DRAWINGS

PREFERRED EMBODIMENTS

Detailed description of this invention in combination with preferred embodiments and drawings is stated as follows; however, this invention is not limited to this aspect.

Figure 1:
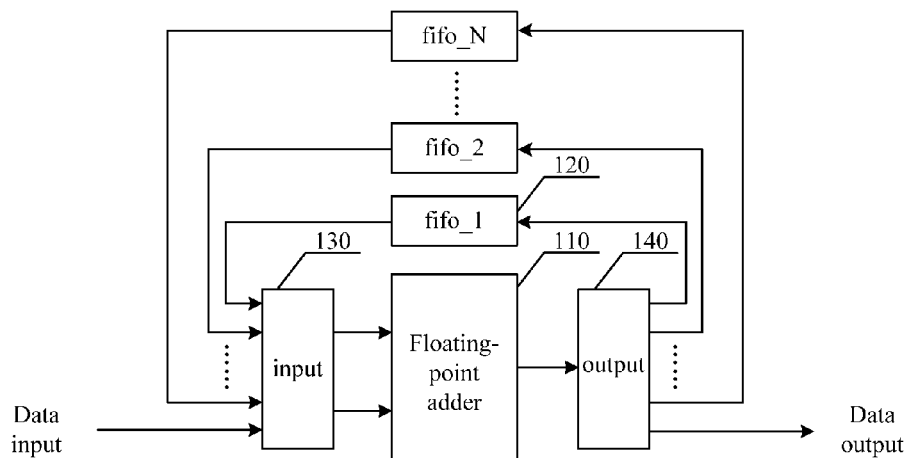
FIG. 1 is a block diagram for internal structure of high-speed low-latency floating-point accumulator of this invention.

A FPGA based high-speed low-latency floating-point accumulator as shown in FIG. 1, particularly comprising:

A floating-point adder unit 110 used for adding operation of input floating points; the floating points include original data, intermediate data on accumulated calculation of floating points at each level and latency of flag bit of input floating points in synchronization with adding of corresponding floating points; the floating-point adder unit 110 comprises a conventional floating-point adding module and a synchronous latency logic module for flag bits, which can be implemented with the help of internal logic resources of FPGA or configurable DSP module; to obtain higher arithmetic speed, floating-point adder unit 110 is normally implemented in the form of multilevel flow line.

N intermediate result buffer units 120, including fifo_1, fifo_2 ... fifo_N as corresponding to accumulated calculation of floating points at each level, which is used to buffer intermediate result of accumulated calculation of floating points; N refers to the number of accumulated levels; the intermediate result buffer unit is implemented with the help of internal fifo of FPGA; as the total data on intermediate results as obtained through floating-point accumulation arithmetic at each level are inconsistent, requirements for the size of intermediate result buffer unit 120 are also different. Therefore, to ensure better utilization of resources, it is applicable to select fifo of appropriate size and type for intermediate buffer unit 120 storing intermediate results obtained through floating-point accumulation arithmetic at different levels according to the quantity of data on intermediate results as obtained through floating-point accumulation arithmetic at each level; this aims to minimize consumption of resources stored in the FPGA;

An input control unit 130 used to control input of floating-point adder unit 110 according to the quantity of currently input original data and data in each buffer.

As each adding operation requires input of two sets of data, adding arithmetic of original data is only available at an interval of 2 clocks when original data is input continuously per clock. The spare clock interval is to be used to read intermediate results in intermediate result buffer unit 120 for arithmetic. If numerous intermediate result buffer units are provided with more than two sets of data, it is applicable to select data of higher priority for adding arithmetic according to the priority corresponding to the intermediate result buffer unit 120 on condition that adding arithmetic is available. To obtain the minimum time latency, data buffer area with higher level of floating-point adding arithmetic is to be given higher priority.

Furthermore, to facilitate output control unit 140 to identify the level of floating-point adding arithmetic corresponding to results as currently output from floating-point adder unit 110, input control unit 130 will set corresponding flag bits for each data as input into the floating-point adder unit 110. Such flag bits are in latency in the form of synchronous displacement to adapt to corresponding adding operation; once the floating-point adding arithmetic of one pair of input data is completed, results of the adding arithmetic and corresponding flag bits following synchronous displacement are to be simultaneously sent to the output control unit 140 by the floating-point adder unit 110.

Therefore, when receiving original data and data on intermediate results of floating-point accumulation arithmetic at all levels, input control unit 130 will set different priorities according to different origins of the data so as to input paired data of the same priority into the floating-point adder unit 110 for adding as per priority level; meanwhile, it also aims to set flag bit for each pair of data as input into the floating-point adder unit 110 so as to mark out the level of floating-point accumulation arithmetic subjecting to adding operation based on the current data; wherein, different priority levels are to be set for data of different origins; namely, the highest priority level is to be set for original data; whereas for data on intermediate results of floating-point accumulation arithmetic at each level, corresponding floating-point accumulation arithmetic of higher level will be given a higher priority level;

An output control unit 140 used to determine the level of floating-point accumulation arithmetic of data output from floating-point adder unit 110 according to flag bit synchronously and latently output from the floating-point adder unit 110. It also aims to judge whether calculated results of current adding as output from the floating-point adder unit 110 is intermediate ones or final ones so as to store intermediate results in the intermediate result buffer unit of corresponding level of floating-point accumulation arithmetic, and output final results.

The method used to implement floating-point accumulation with the help of aforesaid high-speed low-latency floating-point accumulator, comprising:

(1) Original floating-point data input steps: One original floating-point data is input from previous calculating or processing module into the floating-point adder unit 110 during each clock period; the original floating-point data is accumulated by taking $M=2^{N+1}$ data as one group for continuous input of each group of original floating-point data; N refers to the number of accumulation levela;

(2) Input control steps: Input control unit 130 is used to receive original data and data on intermediate results of floating-point accumulation arithmetic at all levels, and set different priorities according to data of different origins so as to input paired data of the same priority into the floating-point adder unit 110 for adding according to priority level. Meanwhile, it also aims to set flag bit for each pair of data as input into the floating-point adder unit 110 so as to mark out the level of floating-point accumulation arithmetic subjecting to adding operation based on the current data; wherein, different priority levels are set for data of different origins; namely, the highest priority level is set for original data; whereas for data on intermediate results of floating-point accumulation arithmetic at each level, corresponding floating-point accumulation arithmetic of higher level will be given a higher priority level;

(3) Floating-point accumulation arithmetic steps: Floating-point adder unit 110 aims to proceed with adding operation of paired floating-point data during each clock period and synchronous latency of flag bit as set by the input control unit in correspondence to such pair of floating-point data;

(4) Output control steps: Output control unit 140 aims to determine the level of floating-point accumulation arithmetic of data output from floating-point adder unit 110 according to flag bit synchronously and latently as output from the floating-point adder unit 110, and accordingly judge whether calculated results of current adding as output from the floating-point adder unit 110 is intermediate ones or final ones so as to store intermediate results in the intermediate result buffer unit 120 of corresponding level of floating-point accumulation arithmetic, and output final results.

When original floating-point data is input into the floating adder unit 110 continuously as per clock period, all steps in aforesaid processes are to be executed in the mode of flow line; final results of each accumulated original floating-point data are to be output at the interval of $M=2^{N+1}-1$ clocks.

Figure 2:
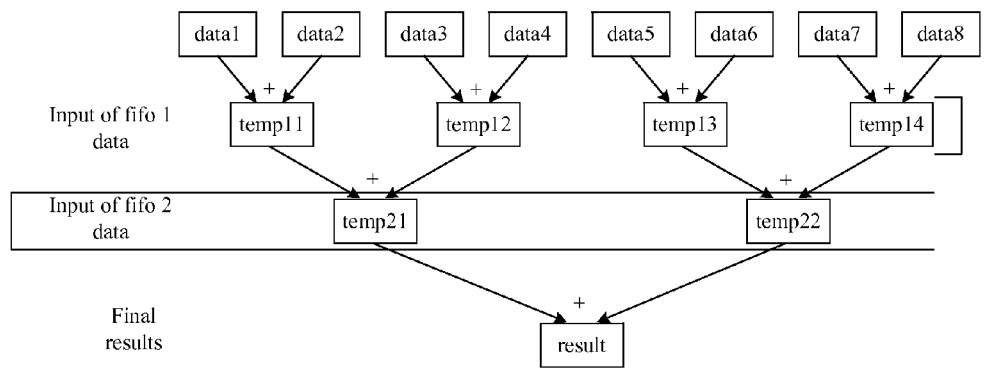
FIG. 2 is a diagram for multilevel floating-point accumulation arithmetic of one group of data in the high-speed low-latency floating-point accumulation realization method of this invention; accumulation level is N=2.

To further describe multilevel floating-point accumulation arithmetic of high-speed low-latency floating-point accumulation realization method in details, floating-point accumulation arithmetic of one group of data for corresponding accumulation level N=2 (namely accumulation is for 8 times) is given in FIG. 2. When intermediate calculation results of different floating-point accumulation arithmetic levels are stored in different fifo through division of floating-point arithmetic process according to Table 1, floating-point adder unit 110 is dynamically allocated for adding calculation at different floating-point accumulation arithmetic levels according to varied quantity of data as stored inside the fifo.

Division of input priority of memory data and original data of different levels are as shown in FIG. 1.

TABLE 1

| Data source | Priority setting | Priority level |
| --- | --- | --- |
| Input of original data | 0 | High |
| fifo__N | 1 | |
| . | . | |
| . | . | |
| . | . | |
| fifo__2 | 2 | Low |
| flfo__1 | N | |

The problem with distribution of input ports of floating-point adder unit 110 can be effectively solved through priority setting when numerous different floating-point accumulation arithmetic levels are to be inputted. As shown in FIG. 1, original data to be accumulated has the highest priority level as it is continuously input during each clock period, and is unlikely to be suspended forcibly; with regard to data from intermediate result buffer units 120 of different floating-point accumulation arithmetic, if higher floating-point accumulation arithmetic level is selected, the data will be more approximate to final accumulation results. It is applicable to minimize output latency of final accumulation results, and reserve space for post buffer area to receive new intermediate results by endowing intermediate results of high floating-point accumulation arithmetic level with higher priority.

The invention claimed is:

1. A field-programmable gate array (FPGA) based high-speed low-latency floating accumulator, characterized in that it comprises:
   a floating-point adder unit used for adding operation of input floating points; the floating points include original data, intermediate result data on accumulated calculation of floating points at each level, and latency of flag bit of input floating points in synchronization with adding operation of the corresponding floating points;
   N intermediate result buffer units, corresponding to accumulated calculation of floating points at each level, which are used to buffer intermediate results of accumulated calculation of floating points; N refers to the number of accumulated levels;
   an input control unit used to receive original data and data on intermediate results of floating-point accumulation arithmetic at all levels, and set different priorities according to data of different origins so as to input paired data of the same priority into the floating-point adder unit for adding according to priority level; meanwhile, it also aims to set flag bit for each pair of data as input into the floating-point adder unit so as to mark out the level of floating-point accumulation arithmetic subjecting to adding operation based on the current data; wherein, different priority levels are set for data of different origins; namely, the highest priority level is set for original data; whereas for data on intermediate results of floating-point accumulation arithmetic at each level, corresponding floating-point accumulation arithmetic of higher level is be given a higher priority level;
   an output control unit used to determine the level of floating-point accumulation arithmetic of data output from floating-point adder unit according to flag bit synchronously and latently output from the floating-point adder unit; the output control unit also judges whether calculated results of current adding operation as output from the floating-point adder unit is intermediate ones or final ones so as to store intermediate results in the intermediate result buffer unit of corresponding level of floating-point accumulation arithmetic, and output final results.

2. The FPGA based high-speed low-latency floating accumulator according to claim 1, characterized in that the floating-point adder unit is implemented by the FPGA internal logic resources or configurable DSP module.

3. The FPGA based high-speed low-latency floating accumulator according to claim 1, characterized in that the floating-point adder unit is implemented in the form of multilevel flow line.

4. The FPGA based high-speed low-latency floating accumulator according to claim 1, characterized in that the intermediate result buffer unit is implemented by internal fifo of FPGA.

5. The FPGA based high-speed low-latency floating accumulator according to claim 1, characterized in that the size and type of the intermediate result buffer unit is determined by the data on intermediate results as obtained through floating-point accumulation arithmetic at each level.

6. A FPGA based high-speed low-latency floating-point accumulation implementation method, characterized in that it comprises:
   (1) original floating-point data input step: an original floating-point data is input from previous calculating or processing module into the floating-point adder unit during each clock period; the original floating-point data is accumulated by taking $M=2^{N+1}$ data as one group; each group of original floating-point data is input continuously; N refers to the number of accumulation levels;
   (2) input control step: an input control unit is used to receive original data and data on intermediate results of floating-point accumulation arithmetic at all levels, and set different priorities according to data of different origins so as to input paired data of the same priority into the floating-point adder unit for adding operation according to priority level; meanwhile, it also aims to set flag bit for each pair of data as input into the floating-point adder unit so as to mark out the level of floating-point accumulation arithmetic subjecting to adding operation based on the current data; wherein, different priority levels are set for data of different origins; namely, the highest priority level is set for original data; whereas for data on intermediate results of floating-point accumulation arithmetic at each level, corresponding floating-point accumulation arithmetic of higher level is given a higher priority level;
   (3) floating-point accumulation arithmetic step: floating-point adder unit aims to proceed with adding operation of paired floating-point data during each clock period and synchronous latency of flag bit as set by the input control unit in correspondence to such pair of floating-point data;
   (4) output control step: output control unit aims to determine the level of floating-point accumulation arithmetic of data output from floating-point adder unit according to flag bit synchronously and latently output from the floating-point adder unit, and accordingly judge whether calculated results of current adding as output from the floating-point adder unit is intermediate ones or final ones so as to store intermediate results in the intermediate result buffer unit of corresponding level of floating-point accumulation arithmetic, and output final results.

7. The realization method according to claim 6, characterized in that the floating-point adder unit is implemented with the help of internal logic resource of FPGA or configurable DSP module.

8. The realization method according to claim 6, characterized in that the floating-point adder unit is implemented in the form of multilevel flow line.

9. The realization method according to claim 6, characterized in that the intermediate result buffer unit is implemented with the help of internal fifo of FPGA.

10. The realization method according to claim 6, characterized in that the size and type of the intermediate result buffer unit is determined by the quantity of intermediate results as obtained through floating-point accumulation arithmetic at each level.

* * * * *